Oct. 26, 1926.
H. L. SMITH
1,604,934
ANTISKID AND PUNCTUREPROOF DEVICE
Filed Dec. 13, 1924   2 Sheets-Sheet 1
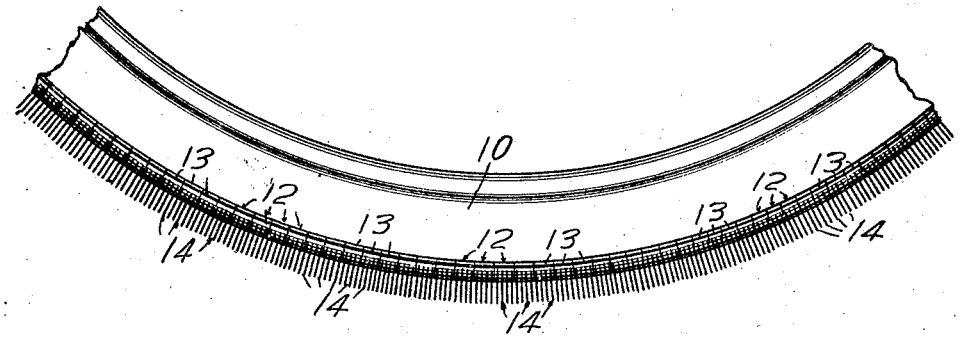
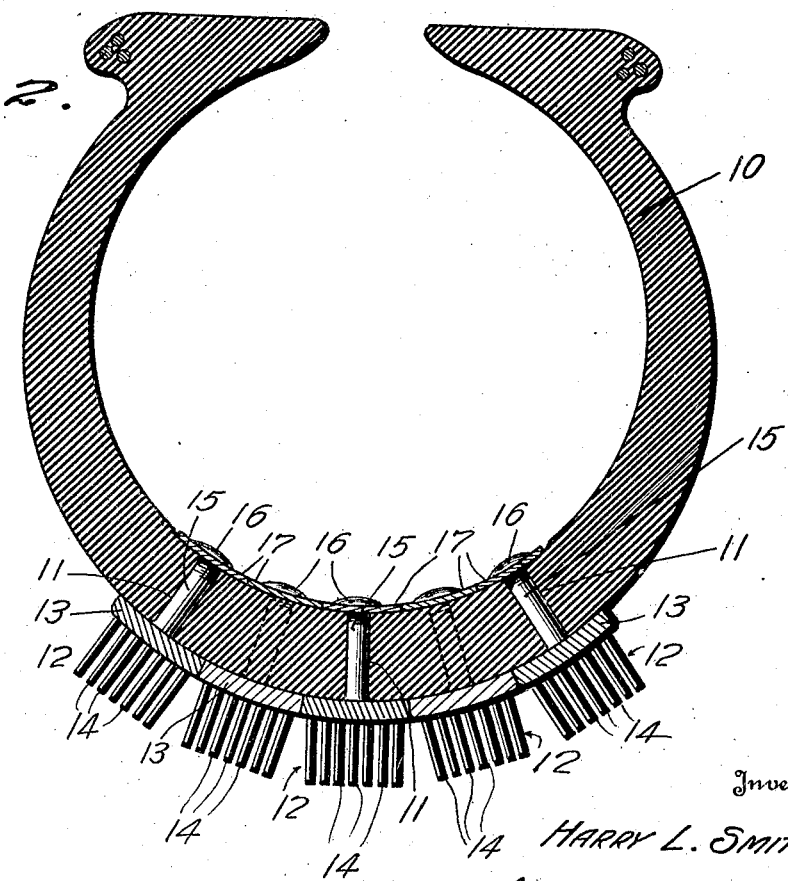
Inventor
HARRY L. SMITH,
By
Attorney Oct. 26, 1926.
H. L. SMITH
1,604,934
ANTISKID AND PUNCTUREPROOF DEVICE
Filed Dec. 13, 1924  2 Sheets-Sheet 2
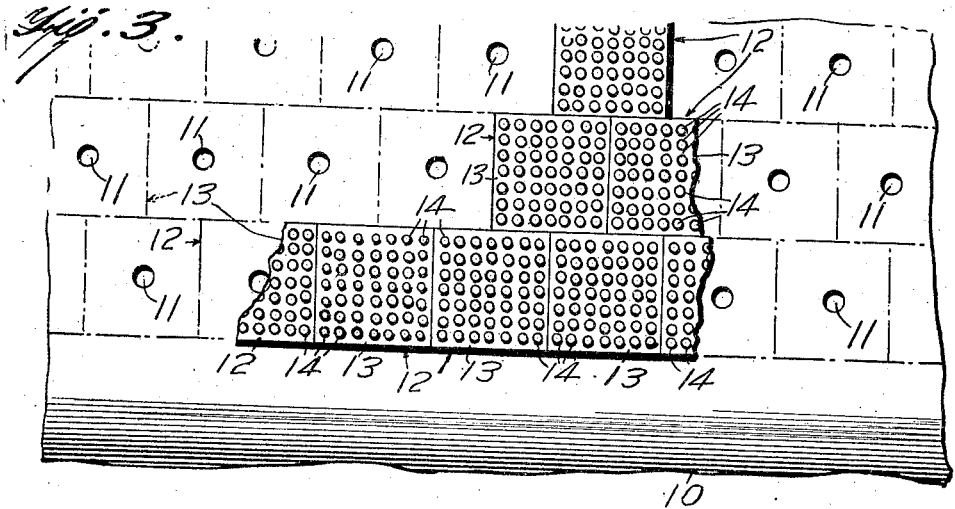
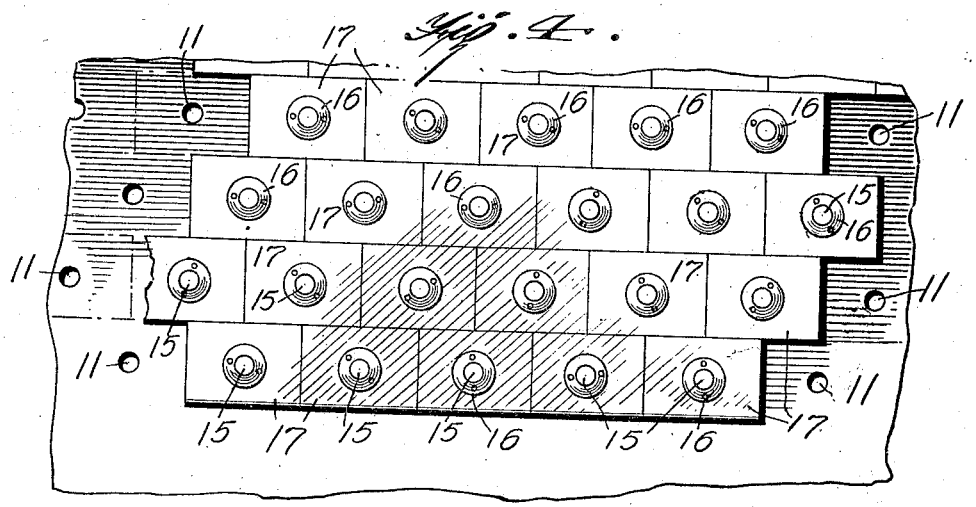
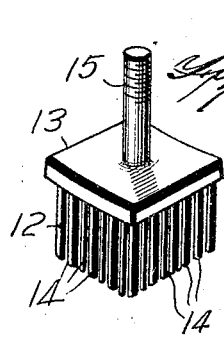
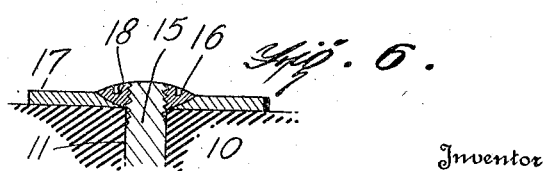
Inventor
HARRY L. SMITH,
Attorney Patented Oct. 26, 1926.

1,604,934

UNITED STATES PATENT OFFICE.

HARRY L. SMITH, OF NEW YORK, N. Y.

ANTISKID AND PUNCTUREPROOF DEVICE.

Application filed December 13, 1924. Serial No. 755,787.

My invention relates to a non-skid and puncture-proof tire, especially adapted for motor vehicles, its object being to provide a very simple, inexpensive and highly effective device in combination with the outer casing which may be readily applied thereto or removed therefrom. The scope of my invention extends to whatever constructions may be defined by or included within the terms or language of the appended claims.

In the drawings:

Figure 1 is a side view of a portion of a tire illustrating my invention;

Figure 2 is an enlarged transverse sectional view thereof;

Figure 3 is a plan view of the outer face of a tire embodying my invention, partially broken away;

Figure 4 is a similar view looking from the inner side of the casing;

Figure 5 is a view in perspective of one of the units of my invention, and

Figure 6 is an enlarged detail sectional view through one of the inner plates.

The forms or embodiments of my invention illustrated in the drawings and briefly described, comprise a relatively thin outer casing, 10, which is provided along the outer face thereof with a plurality of equi-distantly spaced and radially extending openings, 11. These openings, 11, are, of course, formed in the tire when manufactured and, as illustrated, with particular reference to Figures 2 to 4 inclusive, of the drawings, are preferably staggered.

My novel form of anti-skid and punctureproof elements or units indicated generally at 12, each consist of a base plate, 13, which is preferably, though not necessarily, curved to conform to the outer periphery or curvature of the casing to which it is applied. These plates, 13, which are preferably formed square in face view so that they may be very readily placed into position or replaced when required, are provided on their outer face with a plurality of equi-distantly spaced traction pins, 14.

The length of the traction pins, 14, which are preferably extended parallel from the base plate, 13, vary, of course, according to the type of tire or to the weight of the car to which the tire is applied. These traction pins, 14, are formed integral with the base plate, 13, in any desired manner and each of the said pins, although illustrated as being round in cross section, may, if desired, be of other forms. These traction pins being arranged comparatively close together and when constructed of a somewhat flexible steel, will provide a highly effective antiskidding device and the base plates, 13, being arranged contiguous to one another entirely around the circumference of the wheel, will, it will be readily seen, provide an excellent puncture-proof means.

Extending inwardly from the base plates, 13, are shank portions, 15, which are threaded on their extreme ends for the reception of suitable nuts, 16. The shank portions, 15, are, of course, adapted to snugly fit within the openings, 11, formed in the outer face of the tire casing, 10.

Substantially thin and rectangular plates, 17, for the purpose of serving as washers for the nuts, 16, and as auxiliary punctureproof means are located on the inner side of the tire casing, 10, as clearly illustrated in Figure 2 of the accompanying drawing. It will be readily seen by referring to Figure 2 that should a nail or other similar object, perchance, find its way toward the inner side of the tire casing, 10, these plates, 17, being also closely fitted together as are the base plates, 13, will effectively prevent such object from continuing through the casing, 10, to the inner tube not shown.

The surface of the plates, 17, adjacent to the nut, 16, concentrically formed, is a concave portion, 18, as is shown in Figure 6. The concave portion, 18, is adapted to be engaged by a convex portion of the nut, 16, for the purpose of permitting the plate, 17, to tilt somewhat, due to the varying or uneven thickness of the tire casing, 10. Then, too, a construction as disclosed in Figure 6 will permit additional gripping action between the nut, 16, and the shank portion, 15, over the usual flat bottomed nut.

A device built up of units as has been shown and described, may be very readily repaired as, when the traction pins, 14, become worn, bent or broken off from their base plates, 13, by merely removing the nut, 16, and either pushing the certain unit out from the inner side or pulling it from the outer side. A great saving will also be effected in a tire embodying my invention for the reason that the thickness of the walls of the casing may be materially lessened as the usual tread will be, of course, elminated.

I claim:

1. A combined anti-skidding and puncture-proof device for the tires of motor vehicles, comprising a tire casing having openings through the tread portion thereof, a plurality of base plates on the outer tread portion thereof, a plurality of plates on the inner side of said tire casing, means for fastening both sets of said plates together and a plurality of outwardly extending traction pins carried by each of said outer plates.

2. A combined anti-skidding and puncture-proof device for the tires of motor vehicles, comprising a tire casing having openings through the tread portion thereof, a plurality of base plates on the outer tread portion thereof, a plurality of plates on the inner side of said tire casing, a shank portion integrally formed with each of said base plates and provided with a threaded portion for the reception of a lock nut and a plurality of outwardly extending traction pins carried by each of said outer plates, said traction pins of each of said plates arranged parallel.

3. An anti-skidding and puncture-proof tire, comprising a plurality of rectangular plates closely arranged around the tread portion of the tire, a plurality of similarly formed plates closely arranged along the inner side of said tire and means for locking the first-named plates with respect to said last-named plates.

In testimony whereof I hereunto affix my signature.

HARRY L. SMITH.